United States Patent

Simpkin

[11] Patent Number: 5,398,500
[45] Date of Patent: Mar. 21, 1995

[54] CONVERGENT DIVERGENT JET ENGINE NOZZLE

[75] Inventor: William E. Simpkin, Dallas, Tex.

[73] Assignee: Loral Vought Systems Corporation, Grand Prairie, Tex.

[21] Appl. No.: 88,245

[22] Filed: Jul. 7, 1993

[51] Int. Cl.6 .............................................. F02K 1/00
[52] U.S. Cl. .................................. 60/271; 239/265.11
[58] Field of Search ................. 60/271; 239/265.11, 239/265.19, 265.33; 416/244 A, 245 R

[56] References Cited

U.S. PATENT DOCUMENTS

| | | | |
|---|---|---|---|
| 2,516,910 | 8/1950 | Redding | 60/271 |
| 2,557,435 | 6/1951 | Imbert | 239/265.33 |
| 2,857,119 | 10/1958 | Morguloff | 239/265.19 |
| 2,971,327 | 2/1961 | Moy et al. | 60/271 |
| 3,536,262 | 10/1968 | Hachard | 239/265.19 |
| 3,970,252 | 7/1976 | Smale et al. | 60/271 |
| 3,990,638 | 11/1976 | Johnson | 60/271 |

Primary Examiner—Louis J. Casaregola
Attorney, Agent, or Firm—Richards, Medlock & Andrews

[57] ABSTRACT

A thrusting nozzle (24) comprises an annular shell (34) and an inner body (30). The contours of the inner wall (42) of the shell (34) and the outer wall (44) of the inner body (30) form a convergence zone (48), a throat (50), and an outlet zone (52) in sequence from the nozzle inlet (54) to the nozzle outlet (56). The inner body (30) extends from the upstream end of the nozzle to a point downstream of the throat (50). In the convergence zone (48), the cross section area of the flow passage continuously and gradually decreases from the nozzle inlet (54) to the throat (50). In the outlet zone (52), the cross section area of the flow passage can gradually increase from the throat (50) to the nozzle outlet (56). The nozzle (24) can be mounted as part of a jet engine (10), with the nozzle inlet (54) being connected directly to the discharge of a gas turbine (22). The contours of the inner wall (42) of the shell (34) and the outer wall (44) of the inner body (30) are suitable for producing a continuous acceleration of gas velocity from the nozzle inlet to the nozzle outlet, with a sonic gas flow rate in the throat and a supersonic gas flow rate at the nozzle exit for gases having a sufficient pressure differential for the configuration between the nozzle inlet and the nozzle outlet.

19 Claims, 1 Drawing Sheet

FIG. 1

CONVERGENT DIVERGENT JET ENGINE NOZZLE

FIELD OF THE INVENTION

This invention relates to a thrusting nozzle suitable for use with jet engines. In one aspect the invention relates to a jet engine having a rotating plug convergent divergent thrust nozzle.

BACKGROUND OF THE INVENTION

Some of the prior art converging-diverging nozzles for turbojet engines, as exemplified by FIG. 3, use either a fixed or a rotating centerbody "fairing" mounted coaxially with the engine centerline and the longitudinal axis of the nozzle and extending part way from the turbine discharge toward the throat of the nozzle, with the diameter of the centerbody fairing continuously decreasing along its length in the direction of flow, that produces a flow diffusion downstream of the turbine discharge and prior to the gas flow acceleration in the portion of the nozzle which forms the aerodynamic throat. In other words, the gas velocity decreases as the cross sectional flow area increases in the initial portion of the nozzle, resulting in the diffusion of the gases, and then the gas velocity increases as the cross sectional flow area decreases with further movement downstream towards the aerodynamic throat. The gas velocity continues to increase in the divergent portion of the nozzle downstream of the throat.

Alternatively, the centerbody of a prior art nozzle can have an essentially constant cross sectional area perpendicular to the engine centerline and nozzle longitudinal axis, resulting in the nozzle flow having a discontinuous abrupt change in flow direction at the termination of the centerbody prior to the throat region.

In either case, aerodynamic flow pressure losses are produced, resulting in decreased thrust for a given engine operating condition.

Prior art supersonic nozzles have flow diffusion prior to the throat, and do not use a rotating centerbody in the throat region.

SUMMARY OF THE INVENTION

This invention comprises a thrusting nozzle suitable for use with jet engines, with the gas flow passageway having a converging zone upstream of a throat and an outlet zone downstream of the throat. The nozzle comprises an annular shell and an inner body, wherein the inner body can be fixed or rotatably mounted. The outer wall of the inner body forms the inner flow boundary, while the inner wall of the annular shell forms the outer flow boundary for the gas flow passage through the nozzle. The contours of the inner wall of the hollow shell and the outer wall of the inner body form a convergence zone, a throat, and an outlet zone in sequence from the inlet of the nozzle to the outlet of the nozzle. The inner body extends from the upstream end of the nozzle to a point downstream of the throat. In the convergence zone, the cross section area of the flow passage perpendicular to the longitudinal axis of the nozzle continuously and gradually decreases from the nozzle inlet to the throat. In the outlet zone, the cross section area of the flow passage perpendicular to the longitudinal axis of the nozzle can gradually increase from the throat to the nozzle outlet. The nozzle can be mounted as part of a jet engine, with the nozzle inlet being connected directly to the turbine discharge with the annular gas flow area of the turbine discharge and the annular gas flow area of the nozzle inlet being the same and with the aerodynamic boundaries being continuous. Thus, the contours of the inner wall of the hollow shell and the outer wall of the inner body are suitable for producing a continuous acceleration of gas flow rate from the nozzle inlet to the nozzle outlet, with a sonic gas flow rate in the throat and a supersonic gas flow rate at the nozzle exit for gases having a sufficient pressure differential for the configuration between the nozzle inlet and the nozzle outlet.

DETAILED DESCRIPTION OF A PREFERRED EMBODIMENT

Figure 1:
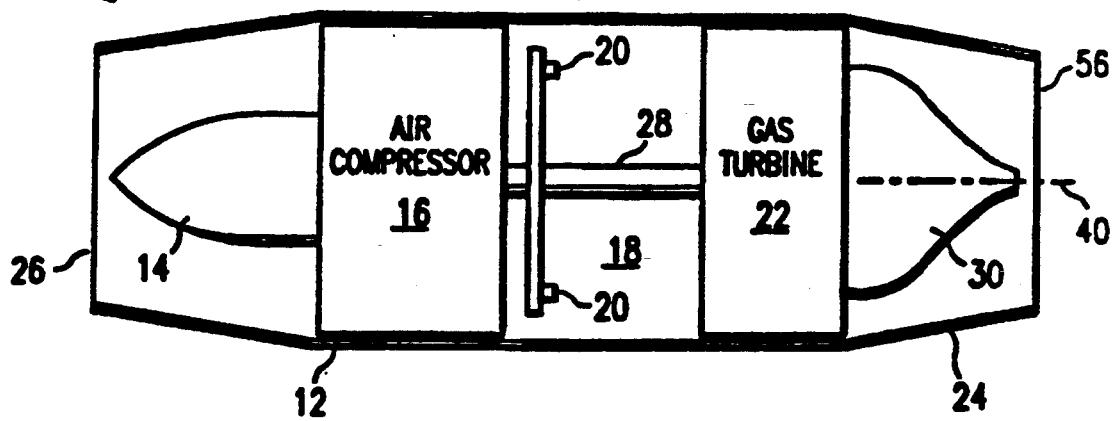
FIG. 1 is a longitudinal cross section of a jet engine having a convergent-divergent nozzle in accordance with the present invention.

Referring now to FIG. 1, the turbojet engine 10 comprises an engine housing 12, a diffuser 14, an air compressor 16, a combustion chamber 18, fuel injectors 20, a gas turbine 22, and a thrust nozzle 24. Atmospheric air enters the engine at engine housing inlet 26, and is initially compressed in the diffuser section 12, and then is further compressed to a much higher pressure in the air compressor section 16. The air compressor section 16 can contain one or more air compressors, which can be either axial-flow type compressors or centrifugal type compressors. The highly compressed air passes into the combustion chamber 18, wherein sufficient fuel is injected via injectors 20 and burned to raise the temperature of the total gases entering the gas turbine 22 to the desired temperature. These total gases, containing air and combustion products, expand in the turbine 22. The turbine 22 is directly connected by shaft 28 to the air compressor 16 and provides the power for driving the air compressor 16. The turbine shaft 28 can also be connected to the inner body 30 of thrust nozzle 24 so that the inner body 30 can be rotated about its longitudinal axis 40. The inner body 30 is mounted within shell 34 coaxially with the engine centerline and the longitudinal axis 40 of the nozzle 24. The nozzle 24 is mounted with its inlet 54 connected directly to the turbine discharge with the annulus area of the turbine discharge and the annulus area of the nozzle inlet 54 being the same and with the aerodynamic boundaries being continuous. The expanded gases pass from the turbine 22 through the gas flow passage 46 of thrust nozzle 24, wherein the gases are further expanded, and are then ejected from the outlet 56 of the nozzle 24 in the form of a high speed gas jet. If desired, an afterburner can be positioned between the outlet of the turbine 22 and the inlet 54 of the nozzle 24. Cooling air can be bled from the compressor section 16 and utilized to cool the blades of a turbine, after which the cooling air passes to the nozzle 24.

Figure 2:
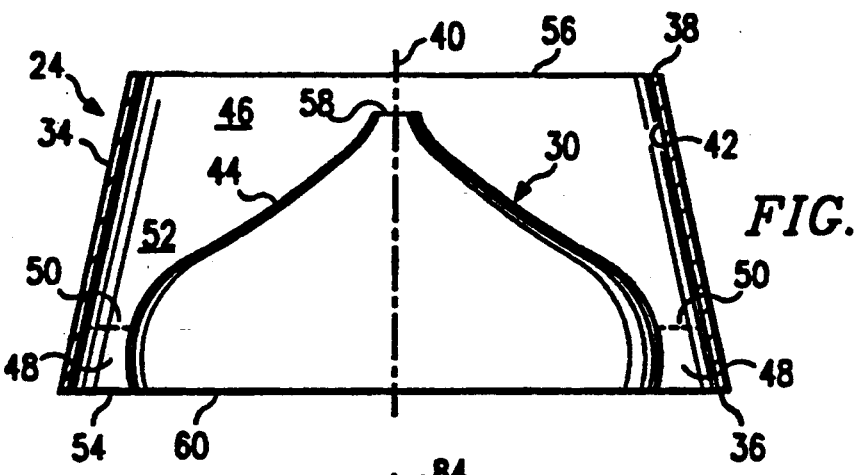
FIG. 2 is an enlarged longitudinal cross section of a rotating plug design of the convergent-divergent nozzle of FIG. 1.

Referring now to FIG. 2, the thrusting nozzle 24 comprises an annular shell 34 and a rotating inner body 30. The non-rotating annular shell 34 has an upstream end 36, a downstream end 38, a longitudinal axis 40 which is coaxial with the centerline of engine 10, and an inner wall 42 which extends generally in the direction of the longitudinal axis 40. The annular shell 34 can be an integral part of the housing 12, can be fixedly secured to the housing 12, or can be mounted on the housing 12 for movement with respect to the housing 12 along the longitudinal axis 40. The inner wall 42 of the shell 34 forms the outer flow boundary, while the outer wall 44 of the inner body 30 forms the inner flow boundary for the gas flow passage 46 through the nozzle 24. The contours of the inner wall 42 of the hollow shell 34 and the outer wall 44 of the inner body 30 provide the gas flow passage 46 with a convergence zone 48, a throat 50, and a divergence zone 52 in sequence from the inlet 54 of the nozzle 24 to the outlet 56 of the nozzle 24. The inner body 30 extends from the nozzle inlet 54 to a point downstream of the throat 50, but stops short of the nozzle outlet 56. The diameter of the outer wall 44 of the inner body 30 increases gradually and continuously from the upstream end 60 of the inner body 30 to the throat 50, and then decreases gradually and continuously from the throat 50 to the downstream end 58 of the inner body 30.

In the convergence zone 48, the cross section area of the flow passage 46, measured in planes perpendicular to the gas flow or to the longitudinal axis 40 of the nozzle 24, continuously and gradually decreases from the nozzle inlet 54 to the throat 50. In the divergence zone 52, the cross section area of the flow passage 46, measured in planes perpendicular to the gas flow or to the longitudinal axis 40 of the nozzle 24, continuously and gradually increases from the throat 50 to the nozzle outlet 56. Thus, by the contours of the inner wall 42 of the hollow shell 34 and the outer wall 44 of the inner body 30 providing an uninterrupted decrease in gas flow area from the nozzle inlet 54 to the throat 50 and an uninterrupted increase in gas flow area from the throat 50 to the nozzle outlet 56, the nozzle 24 is suitable for producing a continuous acceleration of gas flow rate from the nozzle inlet 54 to the nozzle outlet 56, with a sonic gas flow rate in the throat 50 and a supersonic gas flow rate at the nozzle exit 56 for gases having a sufficient pressure differential for the configuration between the nozzle inlet 54 and the nozzle outlet 56.

In the illustrated embodiment of a nozzle in accordance with the invention, the inner wall 42 of shell 34 has an at least substantially frustoconical configuration which is concentric to the longitudinal axis 40, with the diameter of the upstream end 36 of shell 34 being greater than the diameter of the downstream end 38 of shell 34. The inner body 30 is a body of revolution which is rotatably positioned within and coaxially with the annular shell 34, with the diameter of the inner body 30 increasing gradually, without interruption, from the nozzle inlet 54 to the throat 50 and then decreasing gradually, without interruption, from the throat 50 to the downstream end 58 of the inner body 30, thereby providing a smoothly curved longitudinal surface from the upstream end 60 of the inner body 30 to the downstream end 58 of the inner body 30. While the inner body 30 can be supported by struts in a non-rotating manner, it is presently preferred that the inner body 30 be mounted on shaft 28 for rotation with the gas turbine 22. As illustrated in FIG. 2, the downstream end 58 of the inner body 30 can be in the form of a planar surface perpendicular to the longitudinal axis 40 so long as the diameter of the inner body 30 at the downstream end 58 is sufficiently small so as not to adversely affect the gas flow paths within the diverging zone 52 of the nozzle 24.

In the presently preferred embodiment illustrated in FIG. 2, a change in the location of the aerodynamic throat area 50 can be effected by simple axial translation, by the use of shims or actuators, of the shell 34 relative to the inner body 30. Such a throat area change can be desirable in order (1) to effect flow function matching of the engine components (also known as "trimming the engine"), (2) to increase the throat area to accommodate afterburning, and (3) to increase and/or decrease the throat area to alter the compressor operating line so as to provide (a) increased compressor stall margin, (b) increased flow for increasing thrust, and/or (c) improved fuel consumption by decreasing the stall margin.

In order to achieve a higher area ratio, desired for most efficient high Mach number flight, the exit plane diameter of nozzle outlet 56, i.e., the inner diameter of inner wall 42 at downstream end 38, can be larger than the inlet plane diameter of upstream end 36 of shell 34, i.e., the inner diameter of inner wall 42 at upstream end 36. In such case, the configurations of inner wall 42 of shell 34 and outer wall 44 of inner body 30, would be retained from the upstream end 36 of shell 34 to the throat 50 as illustrated in FIG. 2, while downstream of the throat 50 the inner wall 42 of shell 34 could have less geometrical convergence, be cylindrical, or have a diverging configuration. Thus, a family of convergent-divergent nozzles having a given inlet geometry downstream of the aerodynamic throat 50 is possible with such variations in the geometrical configurations of inner wall 42 of shell and outer wall 44 of inner body 30 downstream of the throat 50.

Figure 3:
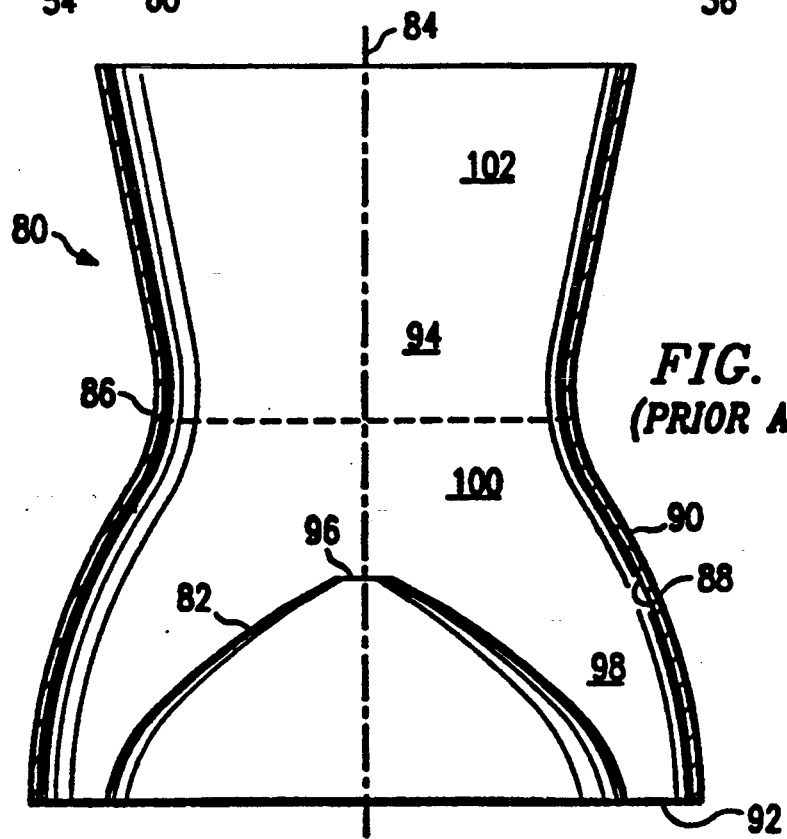
FIG. 3 is a longitudinal cross section of a conventional design of a convergent-divergent jet engine nozzle.

Referring now to FIG. 3, the prior art convergent diverging nozzle 80 includes centerbody "fairing" 82 mounted coaxially with the longitudinal axis 84 of the nozzle 80 and the engine centerline, and extending part way from the turbine discharge toward the nozzle throat 86. The diameter of the fairing 82 decreases continuously along its length in the direction of flow, such that even with the inner wall 88 of housing 90 gradually converging inwardly to provide a smoothly curved portion extending from the upstream end 92 of nozzle 80 to the throat 86, the cross sectional area of the gas flow passage 94, measured in planes perpendicular to the gas flow or to the longitudinal axis 84, increases from the upstream end 92 to the downstream end 96 of the fairing 82, thus resulting in a flow diffusion downstream of the turbine discharge and prior to the throat 86. Thus, the gas flow passage 94 of the nozzle 80 has a diverging zone 98, a converging zone 100, a throat 86, and a diverging zone 102. The fairing 82 can be either fixed or rotatably mounted.

When compared on the same scale to the prior art configuration represented by FIG. 3, the configuration in accordance with the invention, represented by FIG. 2, provides higher performance due to a reduction of flow losses, a major reduction in nozzle length and weight, and simplicity in fabrication.

Reasonable variations and modifications are possible within the scope of the foregoing description, the drawings and the appended claims to the invention.

I claim:

1. A thrusting nozzle suitable for use with jet engines having a turbine, the turbine having a turbine discharge against which a nozzle inlet of said nozzle can be directly positioned, said nozzle comprising:

a non-rotating, annular shell having a longitudinal axis with an inner wall extending generally in the direction of the longitudinal axis from said nozzle inlet to a nozzle outlet; and an inner body of revolution having a longitudinal axis, said inner body having an outer wall with an upstream end and a downstream end, said inner body being positioned within and coaxially with said annular shell with said upstream end of said outer wall being positioned at said nozzle inlet with said outer wall extending downstream toward said nozzle outlet so as to form a gas flow passageway between the outer wall of said inner body and the inner wall of said annular shell, the inner wall of said annular shell providing the outer flow boundary for the gas flow passageway and the outer wall of said inner body providing the inner flow boundary for the gas flow passageway with the nozzle inlet being positioned at the turbine discharge, and with the turbine discharge and the nozzle inlet having the same annular gas flow area and the aerodynamic boundaries of the turbine discharge and the nozzle inlet being continuous;

said inner wall of said annular shell and said outer wall of said inner body being shaped so as to provide an inlet zone, a throat and an outlet zone in a sequence extending from the nozzle inlet to the nozzle outlet, the inner wall of said annular shell and the outer wall of said inner body continuously and gradually converging toward each other in said inlet zone so that the cross sectional area of said gas flow passageway at said throat is smaller than the cross sectional area of said gas flow passageway at said nozzle inlet and so that the cross sectional area of said gas flow passageway continuously and gradually decreases from the nozzle inlet to the throat to produce a continuous acceleration of flow of gases passing through said gas flow passageway, with a sonic velocity of the gases in the throat and a supersonic velocity of the gases at the nozzle outlet for gases having a sufficient pressure differential between the nozzle inlet and the nozzle outlet.

2. A thrusting nozzle suitable for use with jet engines, said nozzle comprising:

a non-rotating, annular shell having a longitudinal axis with an inner wall extending generally in the direction of the longitudinal axis between an inlet and an outlet; and an inner body of revolution having a longitudinal axis, said inner body having an outer wall with an upstream end and a downstream end, said inner body being positioned within and coaxially with said annular shell with said upstream end of said outer wall being positioned adjacent to said inlet of said annular shell with said outer wall extending downstream toward said outlet of said annular shell so as to form a gas flow passageway between the outer wall of said inner body and the inner wall of said annular shell, the inner wall of said annular shell providing the outer flow boundary for the gas flow passageway and the outer wall of said inner body providing the inner flow boundary for the gas flow passageway;

said inner wall of said annular shell and said outer wall of said inner body being shaped so as to provide an inlet zone, a throat and an outlet zone in a sequence extending from the inlet of said annular shell to the outlet of said annular shell, the inner wall of said annular shell and the outer wall of said inner body continuously and gradually converging toward each other in said inlet zone so that the cross sectional area of said gas flow passageway at said throat is smaller than the cross sectional area of said gas flow passageway at said inlet of said annular shell;

wherein said inner body is rotatably positioned within and coaxially with said annular shell so that said inner body can be rotated about its longitudinal axis.

3. A thrusting nozzle in accordance with claim 1, wherein the inner wall of said annular shell and the outer wall of said inner body diverge away from each other in said outlet zone so that the cross sectional area of said gas flow passageway at said throat is smaller than the cross sectional area of said gas flow passageway at the downstream end of said inner body.

4. A thrusting nozzle in accordance with claim 3, wherein said inner wall of said annular shell has an at least substantially frustoconical configuration.

5. A thrusting nozzle in accordance with claim 1, wherein the diameter of said outer wall of said inner body gradually and continuously increases from the upstream end of said inner body to said throat.

6. A thrusting nozzle in accordance with claim 5, wherein the diameter of said inner wall of said annular shell gradually and continuously decreases from the nozzle inlet to said throat.

7. A thrusting nozzle in accordance with claim 6, wherein the diameter of said outer wall of said inner body decreases from said throat to the downstream end of said inner body.

8. A thrusting nozzle in accordance with claim 7, wherein the outer wall of said inner body has a smoothly curved longitudinal surface from the upstream end of said inner body to the downstream end of said inner body.

9. A jet engine comprising an engine housing having a longitudinal axis and containing an air inlet, an air diffuser, an air compressor, a combustion chamber, a gas turbine mounted on a shaft, and a thrust nozzle, said gas turbine having a turbine discharge; said thrust nozzle comprising:

a non-rotating, annular shell positioned coaxially with said longitudinal axis with an inner wall extending generally in the direction of the longitudinal axis between an upstream inlet end and a downstream outlet; and an inner body having an outer wall with an upstream end and a downstream end, said inner body being positioned within and coaxially with said annular shell with said upstream end of said outer wall being positioned adjacent to said upstream inlet end of said annular shell to form a nozzle inlet with said outer wall extending downstream toward said outlet of said annular shell so as to form a gas flow passageway between the outer wall of said inner body and the inner wall of said annular shell, the inner wall of said annular shell providing the outer flow boundary for the gas flow passageway and the outer wall of said inner body providing the inner flow boundary for the gas flow passageway with the nozzle inlet being connected directly to the turbine discharge, and with the turbine discharge and the nozzle inlet having the same annular gas flow area and the aerodynamic boundaries of the turbine discharge and the nozzle inlet being continuous;

said inner wall of said annular shell and said outer wall of said inner body being shaped so as to provide an inlet zone, a throat and an outlet zone in a sequence extending from the upstream inlet end of said annular shell to the downstream outlet of said annular shell, the inner wall of said annular shell and the outer wall of said inner body gradually and continuously converging toward each other in said inlet zone so that the cross sectional area of said gas flow passageway at said throat is smaller than the cross sectional area of said gas flow passageway at said inlet end of said annular shell and so that the cross sectional area of said gas flow passageway continuously and gradually decreases from the nozzle inlet to the throat to produce a continuous acceleration of flow of gases passing through said gas flow passageway, with a sonic velocity of the gases in the throat and a supersonic velocity of the gases at the outlet of said annular shell for gases having a sufficient pressure differential between the nozzle inlet and the outlet of said annular shell.

10. A jet engine in accordance with claim 9, wherein the inner wall of said annular shell and the outer wall of said inner body diverge away from each other in said outlet zone so that the cross sectional area of said gas flow passageway at said throat is smaller than the cross sectional area of said gas flow passageway at the downstream end of said inner body.

11. A jet engine comprising an engine housing having a longitudinal axis and containing an air inlet, an air diffuser, an air compressor, a combustion chamber, a gas turbine mounted on a shaft, and a thrust nozzle; said thrust nozzle comprising:

a non-rotating, annular shell positioned coaxially with said longitudinal axis with an inner wall extending generally in the direction of the longitudinal axis between an upstream inlet end and a downstream outlet; and an inner body having an outer wall with an upstream end and a downstream end, said inner body being positioned within and coaxially with said annular shell with said upstream end of said outer wall being positioned adjacent to said upstream inlet end of said annular shell with said outer wall extending downstream toward said outlet of said annular shell so as to form a gas flow passageway between the outer wall of said inner body and the inner wall of said annular shell, the inner wall of said annular shell providing the outer flow boundary for the gas flow passageway and the outer wall of said inner body providing the inner flow boundary for the gas flow passageway;

said inner wall of said annular shell and said outer wall of said inner body being shaped so as to provide an inlet zone, a throat and an outlet zone in a sequence extending from the upstream inlet end of said annular shell to the downstream outlet of said annular shell, the inner wall of said annular shell and the outer wall of said inner body gradually and continuously converging toward each other in said inlet zone so that the cross sectional area of said gas flow passageway at said throat is smaller than the cross sectional area of said gas flow passageway at said inlet end of said annular shell;

wherein said inner body is rotatably mounted on said shaft so that said inner body can be rotated about said longitudinal axis.

12. A jet engine in accordance with claim 9, wherein said inner wall of said annular shell has an at least substantially frustoconical configuration.

13. A jet engine in accordance with claim 9, wherein the diameter of said outer wall of said inner body increases from the upstream end of said inner body to said throat.

14. A jet engine in accordance with claim 13, wherein the diameter of said outer wall of said inner body decreases from said throat to the downstream end of said inner body.

15. A jet engine in accordance with claim 14, wherein the outer wall of said inner body has a smoothly curved longitudinal surface from the upstream end of said inner body to the downstream end of said inner body.

16. A thrusting nozzle in accordance with claim 8, wherein said inner body is rotatably positioned within and coaxially with said annular shell so that said inner body can be rotated about its longitudinal axis.

17. A thrusting nozzle in accordance with claim 1, wherein said inner body is rotatably positioned within and coaxially with said annular shell so that said inner body can be rotated about its longitudinal axis.

18. A jet engine in accordance with claim 15, wherein said inner body is rotatably mounted on said shaft so that said inner body can be rotated about said longitudinal axis.

19. A jet engine in accordance with claim 9, wherein said inner body is rotatably mounted on said shaft so that said inner body can be rotated about said longitudinal axis.

* * * * *